2,978,674
Patented Apr. 4, 1961

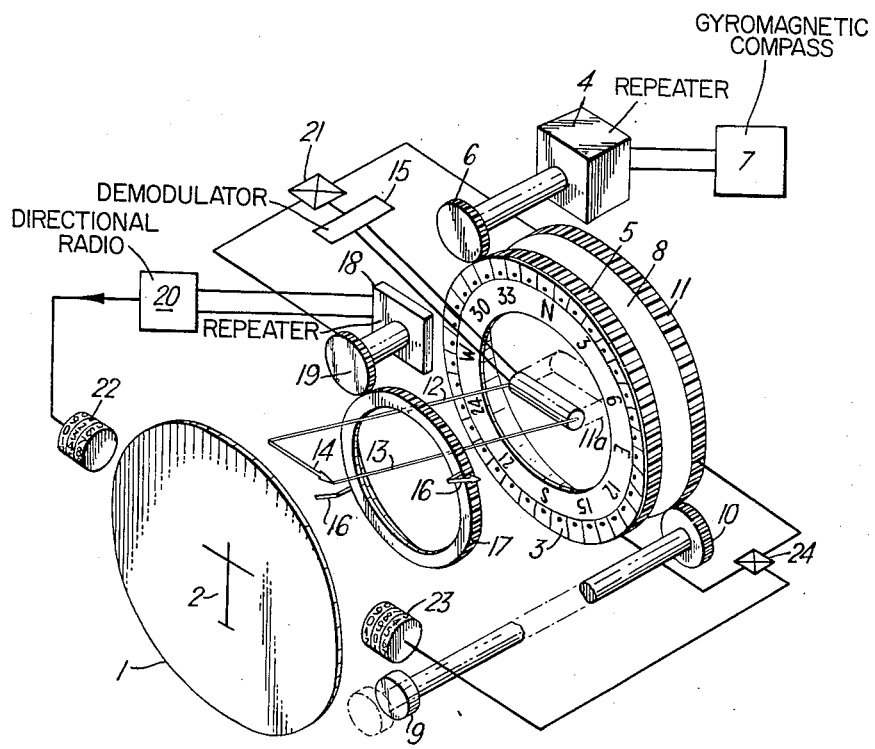

2,978,674

NAVIGATIONAL INSTRUMENTS

Alastair M. A. Majendie, Winter Hill, Cookham Dean, England, assignor to Smiths America Corporation, Washington, D.C.

Filed Nov. 27, 1956, Ser. No. 624,643

11 Claims. (Cl. 340—27)

The present invention relates to navigational instruments for moving craft, particularly for aircraft, and is concerned with the provision of an instrument whereby the control of the craft in azimuth in relation to a track (usually but not necessarily a radio track but hereinafter referred to for definiteness as a "radio track") passing through a fixed station, for definiteness referred to as a "ground station," may be facilitated.

It is desirable for the person responsible for steering the craft, referred to for definiteness as the pilot to know the heading of the craft relative to the track and to have an indication of the displacement of the craft from the track, and it is an object of the present invention to provide an instrument whereby this information may be presented in a readily-appreciated manner.

According to the present invention a navigational instrument for moving craft comprises a bearing scale disposed in a plane, a first pointer, means to rotate said first pointer and scale relative to each other about an axis normal to said plane in accordance with craft heading, a second pointer extending linearly parallel to said plane and settable relative to said scale about said axis, means to displace said second pointer in a direction substantially at right angles to itself and substantially parallel to said plane in accordance with craft displacement from a radio track, a third pointer parallel to said plane, and means to rotate said third pointer relative to the first pointer about said axis in accordance with the direction of a ground station from the craft.

It will be seen that when suitably shaped the pointers represent, in quasi-pictorial fashion, a plan view of the craft in relation to the track and ground station, the first pointer representing the craft (the axis representing its position) the second pointer the track, and the third pointer the line of sight from the craft to the ground station (the third pointer having been set in accordance with the known heading of the track).

Conveniently the first pointer is fixed in position.

The second pointer may be displaced from the axis by an amount proportional to the sine of the angular displacement of the craft from the radio track. In this case the second and third pointers will appear to intersect in a fixed point, which can be taken as representing the position of the ground station.

The accompanying drawing shows schematically an embodiment of the invention suitable for use on an aircraft, certain of the mechanical parts being shown in an "exploded" condition for clarity which will now be described.

The indicating portion of the instrument is housed in a conventional generally cylindrical case, not shown, provided with a conventional viewing window 1 upon which is depicted a conventional luminized representation of the plan view of an aircraft 2, the first pointer. The intersection of the "wings" and "fuselage" lies on the centre-line of the case, which constitutes the axis previously referred to, and in the normal viewing position the fuselage points vertically upwards. A conventional bearing scale 3 is mounted in suitable bearings (not shown) for rotation about the axis, being positioned by a conventional repeater system, indicated by block 4, through annular gear 5 and pinion 6. The input to the repeater 4 is provided by a conventional gyromagnetic compass system, indicated by block 7, so that the position of scale 3 in relation to pointer 2 indicates the (magnetic) heading of the aircraft. A carrier 8 is disposed immediately behind bearing scale 3. Carrier 8 is mounted for rotation about the axis, and is frictionally coupled to scale 3, so that it is normally rotated about the axis by the action of repeater 4. It may however be rotated relative to scale 3 by means of a knob 9 on the front of the instrument controlling a pinion 10 engaging with an annular gear 11 on carrier 8. The relative angular position of carrier 8 and scale 3 is thus settable. Carrier 8 supports a conventional moving coil meter movement indicated at 11a, having its pivotal axis passing through the axis of the case at right angles. The moving coil of the meter 11a carries two similar parallel arms 12, 13, which support, at the end away from the coil, an elongated luminized pointer 14, the second pointer, which lies parallel to the plane of window 1. The position of pointer 14 in relation to the axis is determined by the magnitude of the signal appearing at the output of a demodulator 15 which is connected to the meter coil. A third luminized pointer, 16, is carried upon a ring gear 17 mounted for rotation about the axis. The pointer 16 is in two parts, attached to ring gear 17 at diametrically opposite points but collinear. Pointers 14 and 16 are both provided with arrow heads to indicate track and ground station directions. Ring gear 17 is positioned by a further repeater 18 through a pinion 19. Repeater 18 is controlled from a directional radio installation, indicated at 20, of a known kind in such a manner that the angle between the pointer 16 and the fuselage of the pointer 2 gives the direction of an appropriate ground station in relation to the fore and aft axis of the aircraft.

The input to the demodulator device, 15, previously referred to, is in accordance with the angle between pointer 14 and pointer 16. This input is obtained as the output of a differential device indicated symbolically at 21. This may take any convenient form—for example it may be a synchro having a single rotor winding and a single stator winding, the stator being positioned from gear 11 and energised from an alternating current source and the rotor being positioned from gear 17, the voltage induced in the rotor constituting the differential output and being proportional to the sine of the angle between pointers 14 and 16, and giving after demodulation, an appropriate voltage for application to meter 11.

The radio installation 20 also provides information as to the distance from the ground station, which is displayed upon a conventional counter indicated at 22.

A further counter 23 is also provided to display the heading of the selected track, being driven in accordance with the relative position of scale 3 and carrier 8 by appropriate means, for example a differential gear indicated schematically at 24 having its inputs respectively driven from gears 11 and 5, its output positioning counter 23.

The operation of the device will now be described.

The heading of the craft is indicated by the intersection of the line of the fuselage of pointer 2 and bearing scale 3. Carrier 8 is set, in relation to scale 3, in accordance with the known heading of the track it is desired to follow. Pointers 2 and 16 will together indicate the angle between the direction of the fore and aft axis of the aircraft and the line of sight to the ground station, pointers 2 and 14 together will indicate the angle which the fore and aft axis of the aircraft makes with the track, and the distance of the centre of pointer 2 from pointer 14 is indicative of the displacement of the aircraft from the track. In fact the lines of pointers 14 and 16 will appear from the normal viewing position, to intersect in a fixed point, in the arrangement described, which can be taken as indicative of the position of the ground station.

If it is merely desired to follow a selected heading, pointer 14 will be maintained in its mid position and aligned with pointer 16, pointer 16 being aligned with the selected heading on scale 3.

It will be appreciated that the most important facility provided by the present invention in its broadest aspect is that it presents the aircraft heading, track heading, heading of aircraft relative to track and, at least semi-quantitatively, displacement of aircraft from track in a readily appreciated quasi-pictorial fashion in a single display.

One specific method of attaining the requisite relations between the pointers has been described, but it will be appreciated that different mechanical means could be used to attain these relations, depending for example upon the kind of radio navigational aid available, all of which would fall within the scope of the invention in its broadest aspect.

I claim:

1. A navigational instrument for indicating graphically an aircraft in relation to a guiding radio track which passes through a ground station, the bearing of the ground station with respect to the craft, the heading of the craft with respect to both the radio track and the ground station and the displacement of the aircraft from the guiding radio track comprising a bearing scale disposed in a plane, a first pointer, means to rotate said first pointer and scale relative to each other about an axis normal to said plane in accordance with craft heading, a second pointer extending linearly parallel to said plane and settable relative to said scale about said axis, means to displace said second pointer in a direction substantially at right angles to itself and substantially parallel to said plane in accordance with craft displacement from a radio track, a third pointer extending linearly parallel to said plane, means for generating a signal representing the direction of a ground station from the aircraft and means for applying said signal to rotate said third pointer about said axis relative to the first pointer in accordance with the direction of a ground station from the aircraft and means for mounting said three pointers cooperatively in a single quasi-pictorial display such that the positions of the pointers present the aircraft heading, the track heading, the heading of the aircraft relative to the track, the bearing of the ground station with respect to the craft and, at least semi-quantitatively, the displacement of the aircraft from the track.

2. An instrument as claimed in claim 1 wherein the first pointer is fixed in the instrument.

3. An instrument as claimed in claim 1 wherein the second pointer is mounted upon a carrier frictionally coupled to the bearing scale, but angularly settable with respect thereto.

4. An instrument as claimed in claim 3 wherein the second pointer is positioned by a conventional moving coil meter.

5. An instrument as claimed in claim 1 having means to indicate the angular setting of the second pointer relative to the bearing scale.

6. An instrument as claimed in claim 1 wherein the bearing scale is positioned in accordance with directional information from a gyromagnetic compass installation.

7. An instrument as claimed in claim 1 having also means to display the distance of the craft from the ground station.

8. A navigational instrument for indicating graphically an aircraft in relation to a guiding radio track which passes through a ground station, the bearing of the ground station with respect to the craft, the heading of the craft with respect to both the radio track and the ground station and the displacement of the aircraft from the guiding radio track and comprising a bearing scale disposed in a plane, a first pointer, means for rotating said first pointer and scale relative to each other about an axis normal to said plane in accordance with craft heading, a second pointer extending linearly parallel to said plane and settable relative to said scale about said axis, means for displacing said second pointer in a direction substantially at right angles to itself and substantially parallel to said plane, means for generating a signal representing the sine of the angle between the direction of the ground station from the aircraft and the direction of the radio track, means for supplying said signal to the second pointer displacing means to displace it by an amount and in a sense dependent on the magnitude and sense of said signal, a third pointer extending linearly parallel to said plane and rotatable about said axis relative to the first pointer, means for generating a signal representing the direction of the ground station from the craft, means for applying said last mentioned signal to cause rotation of the third pointer relative to the first in accordance with said direction, and means for mounting said three pointers cooperatively in a single quasi-pictorial display such that positions of the pointers present the aircraft heading, the track heading, the heading of the aircraft relative to the track, the bearing of the ground station with respect to the craft and, at least semi-quantitatively, the displacement of the aircraft from the track.

9. A navigational instrument for indicating graphically an aircraft in relation to a guiding radio track which passes through a ground station, the bearing of the ground station with respect to the craft, the heading of the craft with respect to both the radio track and the ground station and the displacement of the aircraft from the guiding radio track and comprising a bearing scale disposed in a plane, a first pointer, means for rotating said first counter and scale relative to each other about an axis normal to said plane in accordance with craft heading, a second pointer extending linearly parallel to said plane and settable relative to said scale about said axis, means for displacing said second pointer in a direction substantially at right angles to itself and substantially parallel to said plane, a third pointer extending linearly parallel to said plane and rotatable about said axis relative to the first pointer, means for generating a signal representing the direction of a ground station from the aircraft, means for applying said signal to cause rotation of the third pointer relative to the first in accordance with said direction, differential means having first and second inputs, means for applying said signal in addition to the first input of the differential means, means for actuating the second input of the differential means in accordance with the angular setting of the second pointer relative to the first, said differential means being adapted to generate a signal representing the sine of the difference of the signals applied to its inputs, means for applying said sine signal to the second pointer displacing means to displace the second pointer by an amount and in a sense dependent on the magnitude and sense of said signal and means for mounting said three pointers cooperatively in a single quasi-pictorial display such that positions of the pointers present the aircraft heading, the track heading, the heading of the aircraft relative to the track, the bearing of the ground station with respect to the craft and, at least semi-quantitatively, the displacement of the aircraft from the track.

10. A navigational instrument for indicating graphically an aircraft in relation to a guiding radio track which passes through a ground station, the bearing of the ground station with respect to the craft, the heading of the aircraft with respect to both the radio track and the ground station and the displacement of the aircraft from the guiding radio track and comprising a circular bearing scale in the form of a flat ring disposed in a plane, a first pointer lying within said ring, means for rotating said first pointer and said ring relative to each other about an axis normal to said plane through the center of the ring, a second pointer extending linearly parallel to said plane and settable relative to said scale about said axis, its length being less than the inner diameter of the ring, means for displacing said second pointer in a direction substantially at right angles to itself and substantially parallel to said plane in accordance with the aircraft's displacement from the radio track, a third pointer having two collinear portions spaced along a line parallel to said plane and intersecting said axis, said portions lying within the inner diameter of the ring and being spaced apart by a distance substantially equal to the length of the second pointer, and means for rotating said third pointer about said axis relative to the first pointer in accordance with the direction of the ground station from the aircraft.

11. A navigational instrument for indicating graphically an aircraft in relation to a guiding radio track which passes through a ground station, the bearing of the ground station with respect to the craft, the heading of the craft with respect to both the radio track and the ground station and the displacement of the aircraft from the guiding radio track and comprising a bearing scale disposed in a plane, a first pointer, means for rotating said first pointer and scale relative to each other about an axis normal to said plane in accordance with craft heading, a second pointer extending linearly parallel to said plane and settable relative to said scale about said axis, means for displacing said second pointer in a direction substantially at right angles to itself and substantially parallel to said plane, a third pointer extending linearly parallel to said plane and rotatable about said axis relative to the first pointer, means for generating a signal representing the direction of the ground station from the aircraft, means for applying said signal to cause rotation of the third pointer relative to the first in accordance with said direction, differential means having first and second inputs, means for actuating the first input of the differential means in accordance with the angular displacement of the third pointer relative to the first one, means for actuating the second input of the differential means in accordance with the angular displacement of the second pointer relative to the first one, said differential means being adapted to generate a signal representing the sine of the difference of the actuation of its inputs, means for applying said sine signal to the second pointer displacing means to displace the second pointer by an amount and in a sense dependent on the magnitude and sense of said signal and means for mounting said three pointers cooperatively in a single quasi-pictorial display such that positions of the pointers present the aircraft heading, the track heading, the heading of the aircraft relative to the track, the bearing of the ground station with respect to the craft and, at least semi-quantitatively, the displacement of the craft from the track.

References Cited in the file of this patent
UNITED STATES PATENTS

| | | |
|---|---|---|
| 2,502,721 | Halpert | Apr. 4, 1950 |
| 2,532,974 | Warner | Dec. 5, 1950 |
| 2,732,550 | Reedy | Jan. 24, 1956 |